(12) United States Patent
Tanaka (10) Patent No.: US 8,849,510 B2
(45) Date of Patent: Sep. 30, 2014

(54) IN-VEHICLE DISPLAY SYSTEM

(71) Applicant: Panasonic Corporation, Osaka (JP)

(72) Inventor: Tsuyoshi Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 28 days.

(21) Appl. No.: 13/708,469

(22) Filed: Dec. 7, 2012

(65) Prior Publication Data

US 2013/0166146 A1    Jun. 27, 2013

(30) Foreign Application Priority Data

Dec. 22, 2011    (JP) .................................. 2011-280933

(51) Int. Cl.

| | | |
|---|---|---|
| *G06F 3/048* | (2013.01) | |
| *G06F 3/0362* | (2013.01) | |
| *G06F 3/0338* | (2013.01) | |
| *G06F 17/00* | (2006.01) | |
| *G06F 3/038* | (2013.01) | |
| *G06F 3/0482* | (2013.01) | |
| *G06F 3/0488* | (2013.01) | |
| *B60K 37/02* | (2006.01) | |

(52) U.S. Cl.
CPC .............. *G06F 17/00* (2013.01); *G06F 3/0362* (2013.01); *G06F 3/0338* (2013.01); *G06F 2203/0381* (2013.01); *G06F 3/038* (2013.01); *G06F 3/0482* (2013.01); *G06F 3/0488* (2013.01); *B60K 37/02* (2013.01)
USPC .......................................................... 701/36

(58) Field of Classification Search
USPC ...................... 701/36; 345/619, 156
See application file for complete search history.

(56) References Cited

U.S. PATENT DOCUMENTS

| | | | |
|---|---|---|---|
| 7,683,771 B1 * | 3/2010 | Loeb .............................. | 340/461 |
| 2005/0278647 A1 * | 12/2005 | Leavitt et al. ................. | 715/765 |
| 2007/0126698 A1 * | 6/2007 | Iwamoto et al. .............. | 345/156 |
| 2009/0319944 A1 * | 12/2009 | Chikkegowda et al. ....... | 715/804 |
| 2010/0268426 A1 | 10/2010 | Pathak et al. | |
| 2011/0131515 A1 * | 6/2011 | Ono et al. ...................... | 715/764 |
| 2011/0179380 A1 * | 7/2011 | Shaffer et al. ................. | 715/781 |
| 2011/0227718 A1 * | 9/2011 | Waller et al. .................. | 340/461 |

* cited by examiner

*Primary Examiner* — Helal A Algahaim
*Assistant Examiner* — Genna Mott
(74) *Attorney, Agent, or Firm* — McDermott Will & Emery LLP (57) ABSTRACT

An in-vehicle display system includes a steering switch disposed at a steering wheel, an in-vehicle display having a display screen, and a touch panel covering the display screen. When an operator operates the touch panel, the in-vehicle display is operable to display a touch panel menu including icons on the display screen. When the operator operates the steering switch while the touch panel menu is displayed on the display screen, the in-vehicle display is operable to replace the touch panel menu with a steering switch menu to display the steering switch menu on display screen. The steering switch menu includes the icons arranged differently than the touch panel menu. This in-vehicle display system is suitably used to operate both of the touch panel and the steering switch.

5 Claims, 7 Drawing Sheets

IN-VEHICLE DISPLAY SYSTEM

RELATED APPLICATION

This application claims the benefit of Japanese Application No. 2011-280933, filed on Dec. 22, 2011, the disclosure of which Application is incorporated by reference herein.

TECHNICAL FIELD

The technical field relates to an in-vehicle display system that changes a screen of an in-vehicle display.

BACKGROUND

In recent years, an in-vehicle display system has been developed that changes the display of an in-vehicle display in accordance with the operation of a steering switch attached to a vehicle steering wheel.

Figure 7:
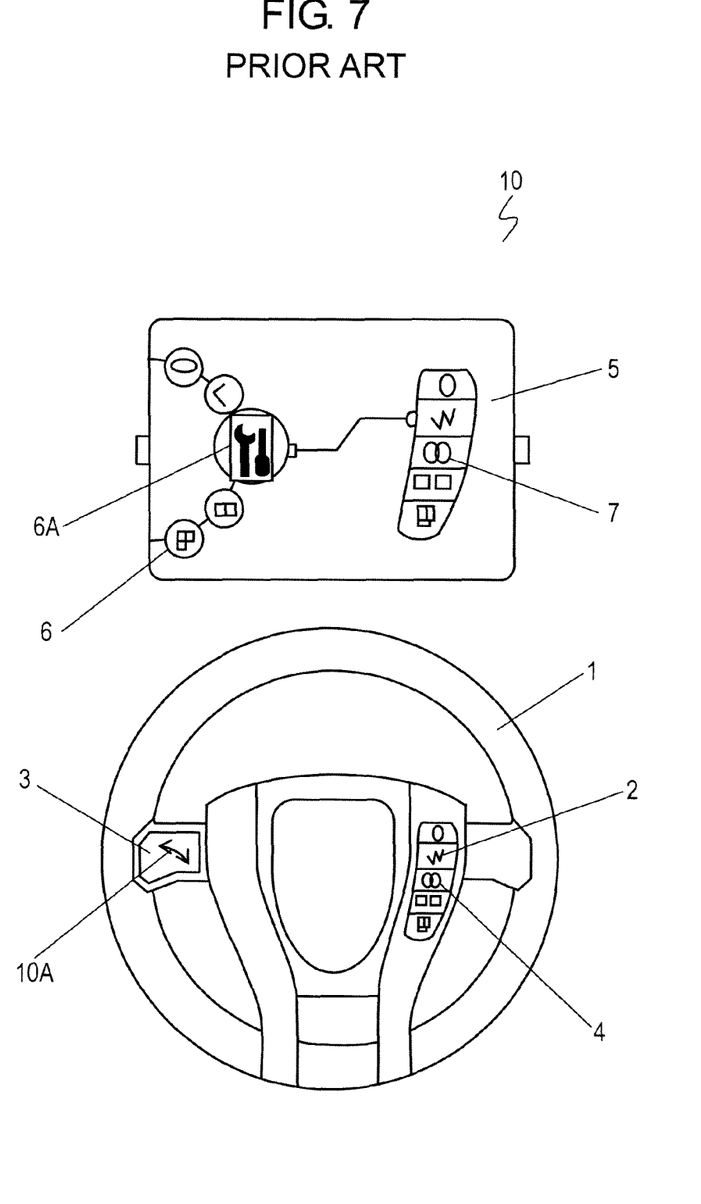
FIG. 7 is a schematic view of a conventional in-vehicle display system.

FIG. 7 is a schematic view of conventional in-vehicle display system 10. On the upper surface of steering wheel 1, steering switch 2 is disposed at the right side on the upper surface, and steering switch 3 at the left side on the upper surface. Steering switch 2 is a press-sensing type switch that can change the display of the upper surface for example. Steering switch 3 is a switch, such as an electrostatic touch pad, that senses that the upper surface thereof is operated by pressing. Steering switches 2 and 3 are electrically connected to in-vehicle display 5, constituting in-vehicle display system 10.

In-vehicle display 5 displays menus 6 of a first layer arranged on an arc. When an operator touches and operates the upper surface of steering switch 3 to draw an arc along the arrow, the positions of menus 6 move along the arc, thereby changing selected menu 6A.

Menus 7 of a second layer are allocated to selected menu 6A. Menus 7 are arranged on in-vehicle display 5.

The same menus as menus 7 are displayed as icons 4 on steering switch 2. The change of selected menu 6A changes the display of icon 4 of steering switch 2, accordingly.

When the operator presses icon 4 on the upper surface of steering switch 2, menu 7 of the second layer corresponding to icon 4 displayed at the pressed position is determined.

Then, the vehicle performs a control corresponding to determined menu 7 of the second layer.

As described above, in conventional in-vehicle display system 10, the operator operates steering switch 3 to select desired menu 6A from menus 6 of the first layer and operates steering switch 2 to select a desired menu from menus 7 of the second layer.

A conventional display system similar to in-vehicle display system 10 is disclosed in U.S. Patent Publication No. 2010/0268426.

SUMMARY

An in-vehicle display system is configured to be mounted to a vehicle including a steering wheel. The in-vehicle display system includes a steering switch disposed at the steering wheel, an in-vehicle display having a display screen, and a touch panel covering the display screen. When an operator operates the touch panel, the in-vehicle display is operable to display a touch panel menu including plural icons on the display screen. When the operator operates the steering switch while the touch panel menu is displayed on the display screen, the in-vehicle display is operable to replace the touch panel menu with a steering switch menu to display the steering switch menu on display screen. The steering switch menu includes the plural icons arranged differently than the touch panel menu.

This in-vehicle display system is suitably used to operate both of the touch panel and the steering switch.

DETAIL DESCRIPTION OF PREFERRED EMBODIMENT

Figure 1:
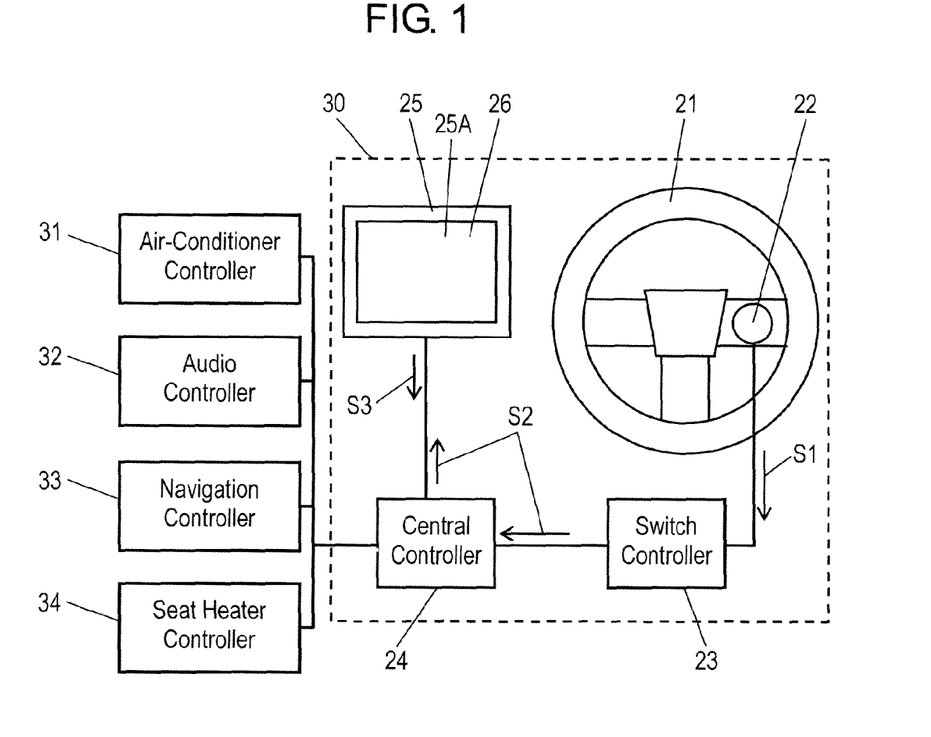
FIG. 1 is a schematic view of an in-vehicle display system according to an exemplary embodiment.

FIG. 1 is a schematic view of in-vehicle display system 30 according to an exemplary embodiment. In-vehicle display system 30 includes steering switch 22, switch controller 23, central controller 24, in-vehicle display 25, and touch panel 26. Steering switch 22 is provided at steering wheel 21.

Switch controller 23 is electrically connected to steering switch 22 and converts operation signal 51 input from steering switch 22 to switch control signal S2.

Central controller 24 is electrically connected to switch controller 23 and in-vehicle display 25. Central controller 24 is also connected to other in-vehicle control devices, such as air-conditioner controller 31, audio controller 32, navigation controller 33, and seat heater controller 34, to control input and output signals between the in-vehicle control devices. Central controller 24 outputs, to in-vehicle display 25, switch control signal S2 input from switch controller 23 for example.

An in-vehicle network protocol may be, for example, Controller Area Network (CAN), FlexRay™, Media Oriented Systems Transport (MOST), or Local Interconnect Network (LIN). Depending on a network protocol to be used, central controller 24 can be eliminated and the mutual connection can be established between switch controller 23 and in-vehicle display 25 and the in-vehicle control device.

Air-conditioner controller 31 controls an air conditioner of the vehicle. Audio controller 32 controls an audio music selection or volume for example. Navigation controller 33 functions as a car navigation system to search a driving route or peripheral facilities. Seat heater controller 34 controls the heating of a driver seat or a front passenger seat.

In-vehicle display 25 has a display element, such as a liquid crystal display, constituting display screen 25A. Touch panel 26 covers display screen 25A and is electrically connected to in-vehicle display 25. When an operator touches touch panel 26, in-vehicle display 25 detects the touched position on touch panel 26, and outputs, to central controller 24, predetermined control signal S3 corresponding to an icon displayed at the position. In accordance with switch control signal S2 input from central controller 24, in-vehicle display 25 outputs predetermined control signal S3 to central controller 24.

In accordance with the touch operation to touch panel 26 or switch control signal S2 input from central controller 24, control signal S3 is output from in-vehicle display 25. Control signal S3 is used to the control in-vehicle control devices, such as air-conditioner controller 31, audio controller 32, navigation controller 33, and seat heater controller 34.

Figure 2:
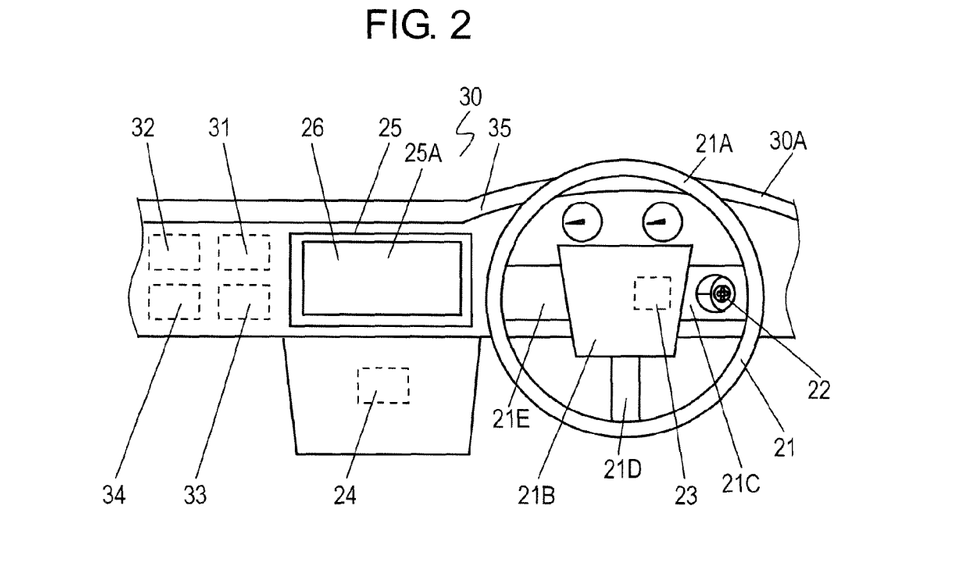
FIG. 2 illustrates the arrangement of the in-vehicle display system according to the embodiment.

FIG. 2 illustrates an arrangement of in-vehicle display system 30 mounted to vehicle 30A.

Steering wheel 21 includes a rim section 21A having a ring shape, center section 21B positioned at the center of rim portion 21A, and spoke sections 21C, 21D, and 21E that radially extend from center section 21B to wheel section 21A. Steering switch 22 is provided at spoke section 21C that is positioned at the right side when steering wheel 21 is at a neutral position. Switch controller 23 is mounted to center section 21B and is connected to steering switch 22 via, e.g. a cable or a harness.

In-vehicle display 25 is mounted to the front panel of instrument panel 35 provided between the driver seat and the front passenger seat. Touch panel 26 is adhered to display screen 25A. Touch panel 26 and in-vehicle display 25 is connected with a cable, such as a flexible print circuit, via a circuit board in in-vehicle display 25.

Instrument panel 35 accommodates central controller 24, air-conditioner controller 31, audio controller 32, navigation controller 33, and seat heater controller 34 therein.

Steering switch 22, in-vehicle display 25, air-conditioner controller 31, audio controller 32, navigation controller 33, and seat heater controller 34 are electrically connected to central controller 24 via a cable or a harness.

Figure 3A:
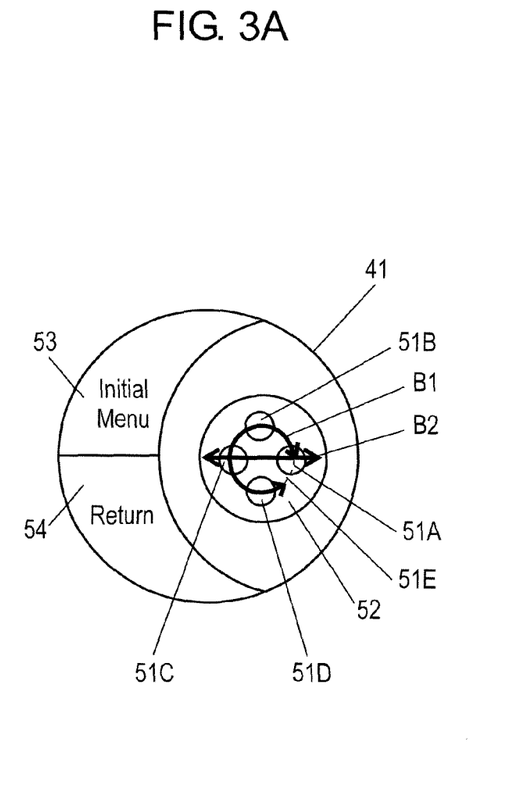
FIGS. 3A and 3B are top views of a steering switch of the in-vehicle display system according to the embodiment.

FIG. 3A is a top view of steering switch 41 that is used as steering switch 22. Steering switch 41 can be operated with a pressing and a rotation. Steering switch 41 includes operation bodies 51A, 51B, 51C, and 51D, ENTER button 52, initial display button 53, and return display button 54. In the description of steering switch 41, the direction shows a direction when steering wheel 21 is at the neutral position.

Operation bodies 51A to 51D are arranged along circumference 51E. Operation body 51A is positioned at the right side. Operation body 51B is positioned at the upper side. Operation body 51C is positioned at the left side. Operation body 51D is positioned at the lower side. Operation bodies 51A and 51C have a spherical shape and can rotate in vertical directions. Operation bodies 51B and 51D have a spherical shape and can rotate in lateral directions. When the operator rotates operation bodies 51A to 51D along circumference 51E with a finger in the direction shown by arrow B1 (a clockwise rotation direction or a counterclockwise rotation direction), then operation bodies 51A to 51D rotates in tangential directions on circumference 51E. Then, switch controller 23 detects the rotation in the clockwise rotation direction or the counterclockwise rotation direction.

In the case that operation bodies 51A and 51C can rotate also in the vertical directions and the lateral directions, when the operator rotates operation bodies 51A and 51C in the direction denoted by arrow B2 (a lateral direction) with a finger, switch controller 23 detects a lateral operation in the right direction or the left direction.

ENTER button 52 is pressed to deactivated. ENTER button 52 is pressed by the operator in order to determine an icon selected with operation bodies 51A to 51D.

Initial display button 53 is a button that can be operated by being pressed. Initial display button 53 is operated by being pressed by the operator in order to return the menu displayed on in-vehicle display 25 to an initial screen.

Return display button 54 is a button that can be operated by being pressed. Return display button 54 is operated by being pressed by the operator in order to return the display of in-vehicle display 25 to the last menu.

Operation bodies 51A to 51D, ENTER button 52, initial display button 53, and return display button 54 are entirely arranged in a circle to constitute steering switch 41.

Figure 3B:
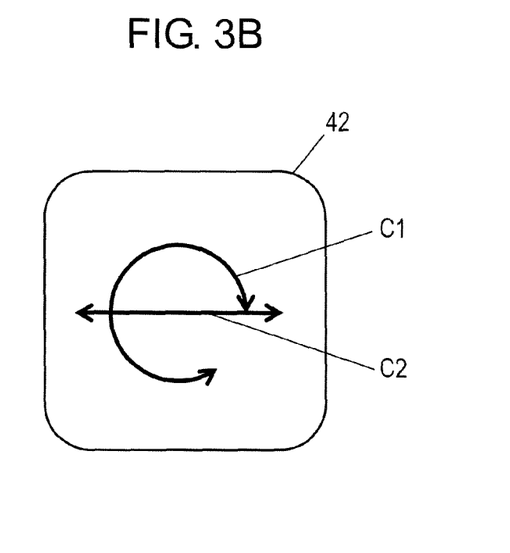

FIG. 3B is a top view of touch pad 42 used as steering switch 22 shown in FIG. 2. When the operator touches the upper surface of touch pad 42, the touched position is detected as a change of a capacitance. When the operator moves a finger in the direction shown by arrow C1 while touching touch pad 42 with the finger, switch controller 23 detects, based on a change in the touched position, whether this operation is an operation in the clockwise rotation direction or in the counterclockwise rotation direction. When the operator moves the finger in the direction denoted by arrow C2 while touching touch pad 42 with the finger, switch controller 23 detects the lateral operation in the right direction or the left direction. When the operator taps the upper surface of touch pad 42 plural times, for example, switch controller 23 detects the continuous contact and separation of the finger to and from the upper surface of touch pad 42.

The change of display screen 25A of in-vehicle display 25 in accordance with the operation of touch panel 26 and steering switch 22 by the operator will be described.

Figure 4A:
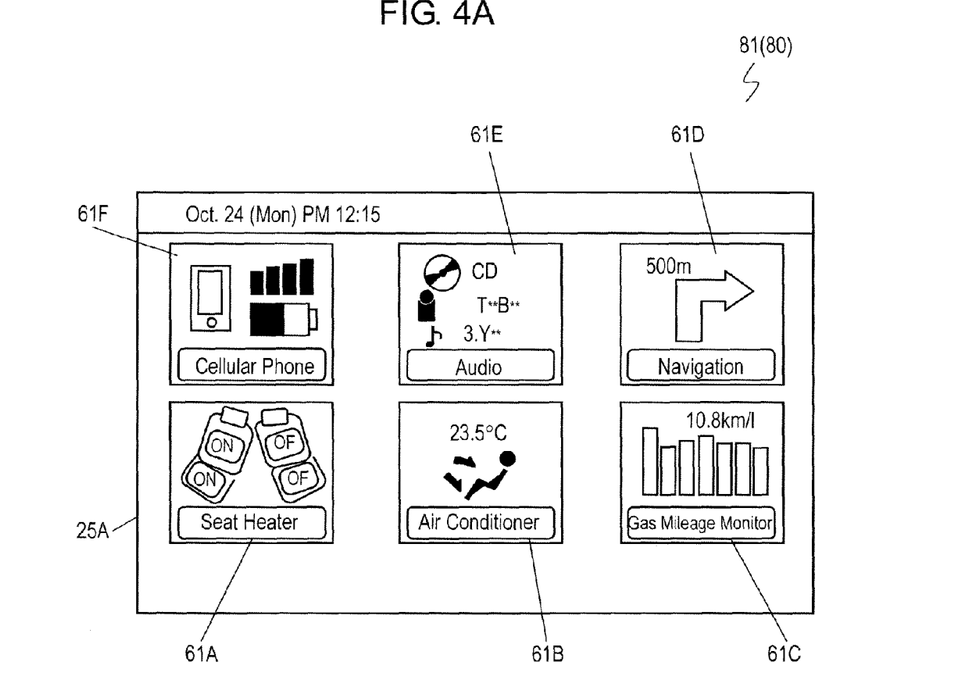
FIG. 4A illustrates a touch panel menu of the in-vehicle display system according to the embodiment.
Figure 4B:
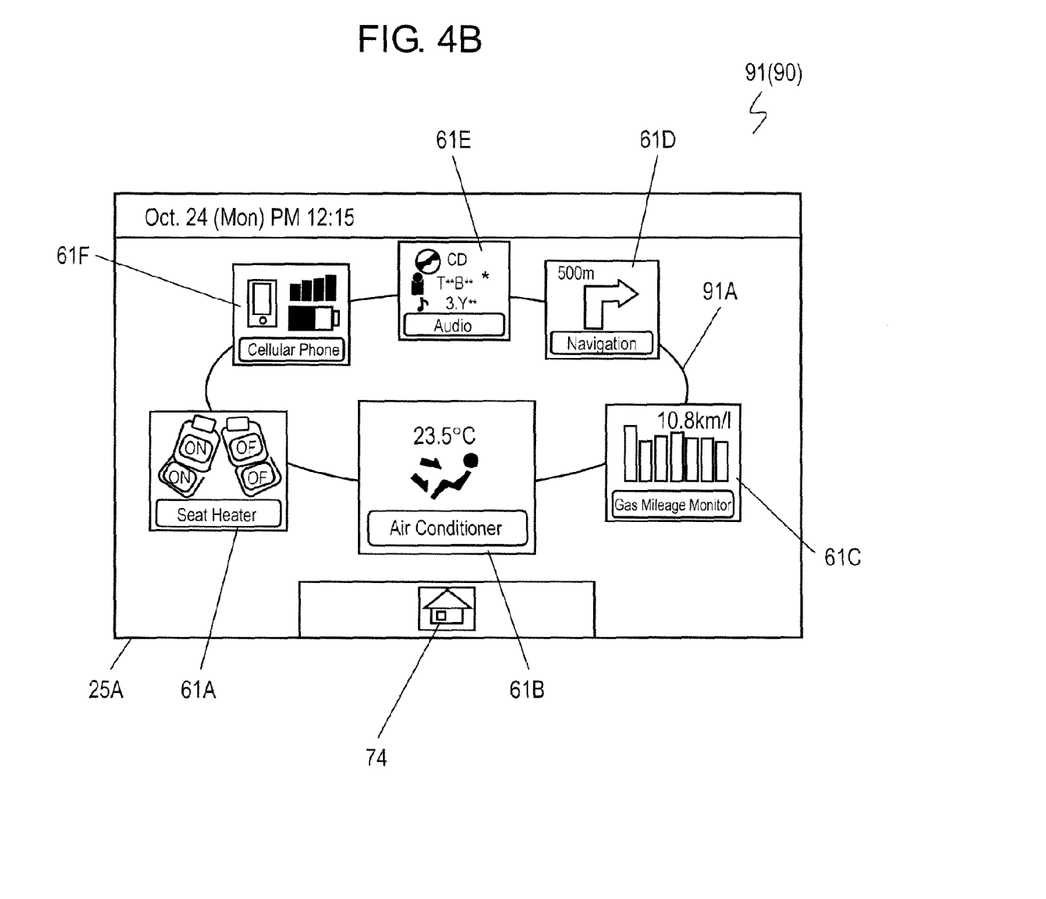
FIG. 4B illustrates a steering switch menu of the in-vehicle display system according to the embodiment.
Figure 5:
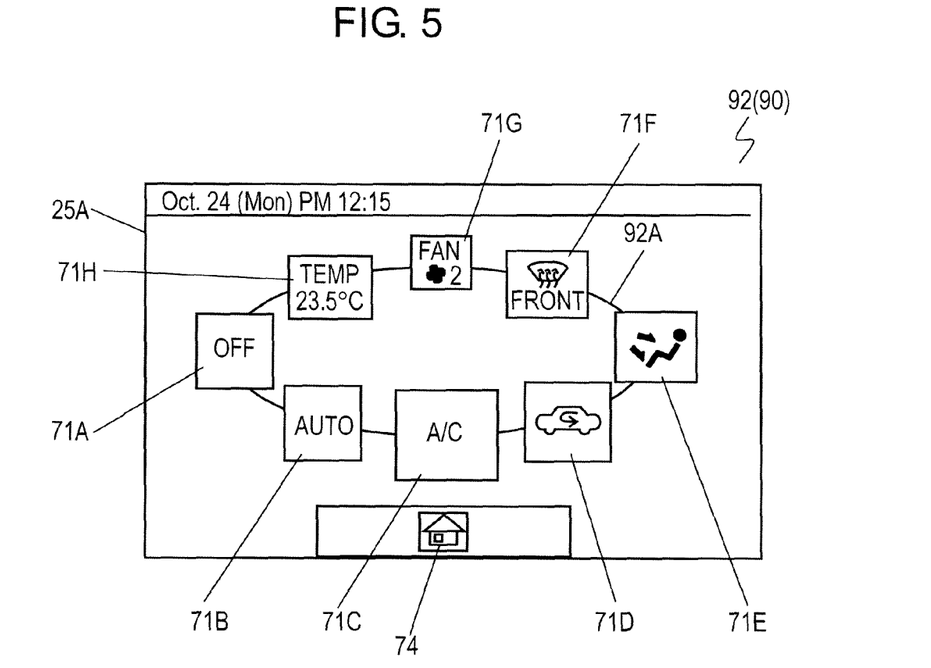
FIG. 5 illustrates the steering switch menu of the in-vehicle display system according to the embodiment.
Figure 6:
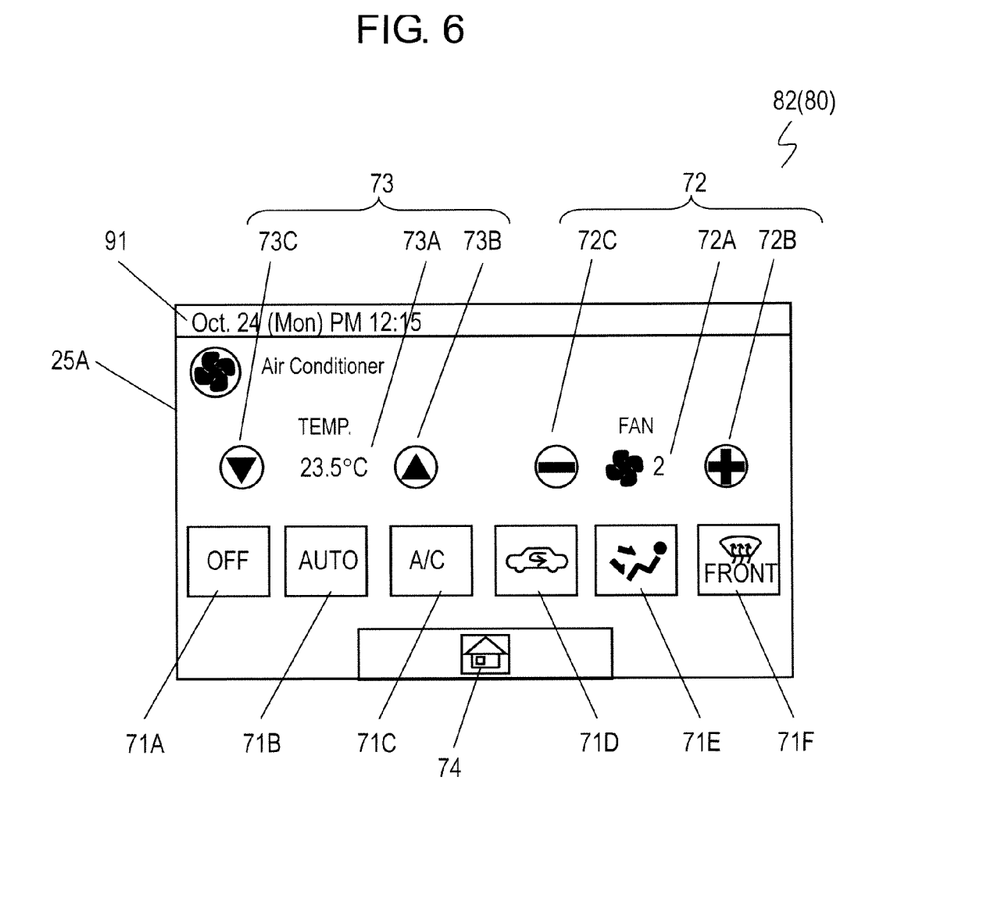
FIG. 6 illustrates a touch panel menu of the in-vehicle display system according to the embodiment.

FIGS. 4A and 4B illustrate menu layer 81 of touch panel menu 80 and menu layer 91 of steering switch menu 90 displayed on display screen 25A of in-vehicle display 25, respectively. FIGS. 5 and 6 illustrate menu layer 92 of steering switch menu 90 and menu layer 82 of touch panel menu 80 displayed on display screen 25A of in-vehicle display 25, respectively. Touch panel menu 80 and steering switch menu 90 are not displayed on display screen 25A simultaneously to each other. As shown in FIGS. 5 and 6, touch panel menu 80 includes menu layers 81 and 82, and steering switch menu 90 includes menu layers 91 and 92. Menu layers 81 and 82 are not displayed on display screen 25A simultaneously to each other. Menu layers 91 and 92 are not displayed on display screen 25A simultaneously to each other.

In menu layer 81 of touch panel menu 80 shown in FIG. 4A, display screen 25A displays icons 61A to 61F and time thereon. Icons 61A to 61F have an identical size and are arranged in a matrix form.

Icon 61A denotes a seat heater function to heat the driver seat and the front passenger seat. Icon 61B denotes a control function to control an air conditioner. Icon 61C denotes a control function for controlling the display of a gas mileage monitor. Icon 61D denotes a navigation function to control the navigation. Icon 61E denotes an audio function. Icon 61F denotes a communication function, such as the sending and receiving of mails via a mobile phone.

Menu layer 81 of touch panel menu 80 is an initial screen. The operator starts the operation to in-vehicle display system 30 through menu layer 81.

Menu layer 91 of steering switch menu 90 shown in FIG. 4B will be described below.

When the operator operates steering switch 22 while menu layer 81 of touch panel menu 80 shown in FIG. 4A is displayed on display screen 25A of in-vehicle display 25, in-vehicle display 25 replaces menu layer 81 of touch panel menu 80 with menu layer 91 of steering switch menu 90 shown in FIG. 4B to display menu layer 91.

In the case that steering switch 22 is steering switch 41 shown in FIG. 3A, the operation to steering switch 22 means that the operator rotates any of operation bodies 51A to 51D or presses ENTER button 52. In the case that steering switch 22 is touch pad 42 shown in FIG. 3B, the operation to steering switch 22 means that the operator touches the upper surface of touch pad 42.

Menu layer 91 of steering switch menu 90 includes icons 61A to 61F arranged in a ring form along ellipse circumference 91A. Ellipse circumference 91A shown in FIG. 4B has an ellipsoidal shape, but may have a circular shape or a shape, such as a corner-rounded rectangular shape, constituted by a closed curve similar to an ellipsoidal shape. Icon 61B positioned at the center of the lower side has a larger size than other icons 61A and 61C to 61F to indicate that icon 61B is a currently-selected icon. Other icons 61A and 61C to 61F having a smaller size as being located along ellipse circumference 91A away from icon 61B which is the selected icon.

This arrangement provides a perspective visual effect so that the operator can visually recognize icon 61B as a selected icon as if icon 61B is closer to the operator than other icons, thus allowing the operator to easily recognize the selected icon.

When the operator touches the upper surface of steering switch 22 (41, 42) with a finger and moves the finger in the clockwise rotation direction while menu layer 91 shown in FIG. 4B is displayed on display screen 25A, icons 61A to 61F are shifted along ellipse circumference 91A in the clockwise rotation direction. When the operator touches the upper surface of steering switch 22 with a finger and moves the finger in the counterclockwise rotation direction along the circumference, icons 61A to 61F are shifted along ellipse circumference 91A in the counterclockwise rotation direction. For example, the operator touches the upper surface of steering switch 22 with a finger and moves the finger in the clockwise rotation direction along the circumference to shift icons 61A to 61F one by one along ellipse circumference 91A in the clockwise rotation direction and to change the selected icon from icon 61B to icon 61C. When the operator touches the upper surface of steering switch 22 with a finger and moves the finger in the counterclockwise rotation direction along the circumference, icons 61A to 61F are shifted along ellipse circumference 91A in the counterclockwise rotation direction and the selected icon is changed from icon 61B to icon 61A.

As described above, when the operator operates steering switch 22 while touch panel menu 80 including icons 61A to 61F is displayed on display screen 25A, the display on display screen 25A is changed to show steering switch menu 90 including icon 61A to 61F arranged differently than touch panel menu 80. As a result, the operator can operate both of touch panel 26 and steering switch 22 easily.

Touch panel menu 80 includes icons 61A to 61F arranged in a matrix form. Steering switch menu 90 includes icons 61A to 61F arranged in a ring form or an arcuate form along ellipse circumference 91A. Thus, the operator can more easily visually identify the change of the menus.

The display of the in-vehicle display of conventional in-vehicle display system 10 shown in FIG. 7 is suitably operated by a steering switch. However, with an increase of in-vehicle displays using touch panels, a menu suitable for operations by both a touch panel and a steering switch has not been presented.

Menu layer 92 of steering switch menu 90 shown in FIG. 5 will be described below.

When the operator selects and operates steering switch 22 while menu layer 91 of steering switch menu 90 shown in FIG. 4B is displayed on display screen 25A, in-vehicle display 25 replace menu layer 91 shown in FIG. 4B with menu layer 92 of steering switch menu 90 shown in FIG. 5 to display menu layer 92 on display screen 25A.

In the case that steering switch 22 is steering switch 41 shown in FIG. 3A, the operator presses ENTER button 22 to select and operate steering switch 22. In the case that steering switch 22 is touch pad 42 shown in FIG. 3B, the operator tap the upper surface of touch pad 42 plural times to select and operate steering switch 22.

Menu layer 92 of steering switch menu 90 shown in FIG. 5 includes icons 71A to 71H arranged in a ring form along ellipse circumference 92A while icon 71C displayed as a selected icon has a larger area than other icons 71A, 71B, and 71D to 71H. Icons 71A to 71H are for controlling air-conditioner controller 31 as an in-vehicle control device to set and control the air conditioner. Ellipse circumference 92A has an ellipsoidal shape similarly to ellipse circumference 91A shown in FIG. 4B. However, ellipse circumference 92A may have a circular shape or a shape, such as a corner-rounded rectangular shape, formed by a closed curve similar to the ellipsoidal shape.

Icons 71A to 71H are for controlling air-conditioner controller 31 that is the in-vehicle control device shown in FIG. 1 for controlling the air conditioner installed to vehicle 30A. Icon 71A is for turning off the air conditioner which is turned on. Icon 71B is for turning on and off an automatic setting of the air conditioner. Icon 71C is for turning on the air conditioner which is turned off. Icon 71D is for switching between the inside air circulation and the outside air introduction of the ventilation function. Icon 71E is for switching the wind direction. Icon 71F is for turning on and off a windshield defroster function. Icon 71G is for set an air-flow volume. Icon 71H is for setting a temperature.

When the operator touches and operates the upper surface of steering switch 22 with a finger and moves the finger in the clockwise rotation direction along the circumference while menu layer 92 of steering switch menu 90 shown in FIG. 5 is displayed on display screen 25A of in-vehicle display 25, icons 71A to 71H are shifted along ellipse circumference 92A in the clockwise rotation direction. When the operator touches and operates the upper surface of steering switch 22 with a finger and moves the finger in the counterclockwise rotation direction along the circumference while menu layer 92 of steering switch menu 90 shown in FIG. 5 is displayed on display screen 25A of in-vehicle display 25, icons 71A to 71H are shifted along ellipse circumference 92A in the counterclockwise rotation direction. For example, when the operator touches and operates the upper surface of steering switch 22 with a finger and moves the finger in the clockwise rotation direction along the circumference while menu layer 92 of steering switch menu 90 shown in FIG. 5 is displayed in display screen 25A of in-vehicle display 25, icons 71A to 71H are shifted one by one along ellipse circumference 92A in the clockwise rotation direction and the selected icon is changed from icon 71C to icon 71D. For example, when the operator touches and operates the upper surface of steering switch 22 with a finger and moves the finger in the counterclockwise rotation direction along the circumference while menu layer 92 of steering switch menu 90 shown in FIG. 5 is displayed in display screen 25A of in-vehicle display 25, icons 71A to 71H are shifted one by one in the counterclockwise rotation direction and the selected icon is changed from icon 71C to icon 71B.

Thus, when the operator operates steering switch 22 while menu layer 91 of steering switch menu 90 is displayed on display screen 25A of in-vehicle display 25, in-vehicle display 25 replaces menu layer 91 with menu layer 92 of steering switch menu 90 to display menu layer 92 on display screen 25A.

Menu layer 82 of touch panel menu 80 shown in FIG. 6 will be described. When the operator touches and operates a position on touch panel 26 corresponding to, e.g. icon 61B while menu layer 81 of touch panel menu 80 shown in FIG. 4A is displayed on display screen 25A of in-vehicle display 25, in-vehicle display 25 replaces menu layer 81 with menu layer 82 of touch panel menu 80 shown in FIG. 6 to display menu layer 82 on display screen 25A.

Menu layer 82 of touch panel menu 80 shown in FIG. 6 includes icons 71A to 71F that are identical to icons 71A to 71F of menu layer 92 of steering switch menu 90 shown in FIG. 5. Air-flow volume setting icon 72 and temperature setting icon 73 are displayed at the upper side of icons 71A to 71F.

Air-flow volume setting icon 72 includes current setting indication 72A, increase-setting icon 72B, and decrease-setting icon 72C. Temperature setting icon 73 includes current setting indication 73A, increase-setting icon 73B, and decrease-setting icon 73C.

When the operator touches and operates the position on touch panel 26 corresponding to icon 71A, the fan function is turned on and off at each touch operation. When the operator touches and operates the position on touch panel 26 corresponding to icon 71B, the automatic adjustment function of the air conditioner is turned on and off at each touch operation. When the operator touches and operates the position on touch panel 26 corresponding to icon 71C, the air conditioner is turned on and off at each touch operation. When the operator touches and operates the position on touch panel 26 corresponding to icon 71D, the inside air circulation/outside air introduction of the ventilation function is switched at each touch operation. When the operator touches and operates the position on touch panel 26 corresponding to icon 71E, the air blowing direction is switched between foot and front in a predetermined order at each touch operation. When the operator touches and operates the position on touch panel 26 corresponding to icon 71F, the defroster function of the windshield is turned on and off at each touch operation.

When the operator touches and operates the position on touch panel 26 corresponding to increase-setting icon 72B, the number on current setting indication 72A increases by one step at each touch operation. When the operator touches and operates the position on touch panel 26 corresponding to decrease-setting icon 72C, the number on current setting indication 72A decreases by one step at each touch operation. When the operator touches and operates the position on touch panel 26 corresponding to increase-setting icon 73B, the temperature displayed on current setting indication 73A increases by 0.5° C. When the operator touches and operates the position on touch panel 26 corresponding to decrease-setting icon 73C, the temperature displayed on current setting indication 73A decreases by 0.5° C.

Thus, a function switched in a predetermined order, such as turning on and off and the wind direction, is switched at every touch operation on one icon. A function, such as the temperature setting and the air-flow volume setting, for which an increase or a decrease can be set is set at each touch operation by touch operations on the icons of increase-setting icons 72B and 73B as well as decrease-setting icons 72C and 73C.

When the operator operates steering switch 22 while menu layer 82 of touch panel menu 80 shown in FIG. 6 is displayed on display screen 25A, in-vehicle display 25 replaces menu layer 82 shown in FIG. 6 with menu layer 92 of steering switch menu 90 shown in FIG. 5 to display menu layer 92 on display screen 25A.

Thus, touch panel menu 80 includes menu layers 81 and 82. Steering switch menu 90 includes menu layers 91 and 92. Menu layers 81 and 82 of touch panel menu 80 correspond to menu layers 91 and 92 of steering switch menu 90, respectively. When the operator operates steering switch 22 while certain menu layer 82 of touch panel menu 80 is displayed on display screen 25A of in-vehicle display 25, in-vehicle display 25 replaces menu layer 82 with menu layer 92 out of menu layers 91 and 92 corresponding to menu layer 82 to display menu layer 92 on display screen 25A. As a result, the operator does not need to operate steering switch 22 while going back and forth between different menu layers, thus providing a quick operation of in-vehicle display system 30 with steering switch 22.

When the operator touches and operates the position on touch panel 26 corresponding to initial return icon 74 while menu layer 82 of touch panel menu 80 shown in FIG. 6 is displayed on display screen 25A, in-vehicle display 25 replaces menu layer 82 with menu layer 81 of touch panel menu 80 shown in FIG. 4A as an initial menu to display menu layer 81 on display screen 25A.

Initial return icon 74 is displayed both in menu layer 91 of steering switch menu 90 shown in FIG. 4B and in menu layer 92 of steering switch menu 90 shown in FIG. 5. When the operator touches and operates the position on touch panel 26 corresponding to initial return icon 74, in-vehicle display 25 replaces these menu layers with menu layer 81 of touch panel menu 80 shown in FIG. 4A to menu layer 81 on display screen 25A.

In the case that steering switch 41 shown in FIG. 3 is used as steering switch 22, when the operator presses and operates initial display button 53, in-vehicle display 25 replaces the menu layer displayed just before the pressing operation with menu layer 81 of touch panel menu 80 shown in FIG. 4A to display menu layer 81 on display screen 25A.

When operator touches and operates the position on touch panel 26 corresponding to icon 61B while menu layer 91 of steering switch menu 90 shown in FIG. 4B is displayed on display screen 25A, one icon 61B is selected from icons 61A to 61F displayed at the touched position, and menu layer 82 of touch panel menu 80 shown in FIG. 6 that corresponds to selected icon 61B is displayed on display screen 25A.

That is, when the operator touches and operates touch panel 26 while steering switch menu 90 is displayed on display screen 25A, an icon that is displayed at the position on display screen 25A corresponding to the touched position of touch panel 26 is selected. As a result, even the touch operation on touch panel 26 is effective even with steering switch menu 90, thus providing a quick operation.

In menu layers 91 and 92 of steering switch menu 90 shown in FIGS. 4B and 5, a selected icon is displayed with a larger size than other icon. The selected icon may have a different color, pattern, or shape to allow the operator to recognize the selected icon from other icons.

In the above description, when the operator touches and operates steering switch 22 with steering switch menu 90 along the circumference, the positions of icons 61A to 61F and icons 71A to 71H are rotated. However, this is not the only embodiment Another configuration may be used in which the icon position is rotated when the operator laterally operates steering switch 22 in the direction shown by arrow B2 in FIG. 3A or in the direction shown by arrow C2 in FIG. 3B.

Steering switch 22 may be implemented by a steering switch with a resistor film-type touch panel, a steering switch for detecting an operation direction by pressing push switches, or a steering switch for detecting the travel amount, direction, or speed of a finger or a roller using light, laser, or a magnetic field.

The shape of the operation surface of steering switch 22 is not limited to a circular or square shape. The operation surface of steering switch 22 may have any shape so long as the operation is possible, including a polygonal shape, a rounded polygonal shape, or an ellipsoidal shape.

As described above, in in-vehicle display system 30 according to the embodiment, when the operator operates steering switch 22 while touch panel menu 80 including icons 61A to 61F is displayed on display screen 25A, display screen 25A newly displays steering switch menu 90 including icons 61A to 61F arranged differently than touch panel menu 80. Thus, in-vehicle display system 30 can be easily operated with both of touch panel 26 and steering switch 22.

Touch panel menu 80 includes icons 61A to 61F arranged in a matrix form. Steering switch menu 90 includes icons 61A to 61F arranged in a ring form or in an arcuate form along ellipse circumference 91A (92A). Thus, the operator can visually identify the change of the menus easily.

Touch panel menu 80 includes menu layers 81 and 82. Steering switch menu 90 includes menu layers 91 and 92. Menu layers 81 and 82 of touch panel menu 80 correspond to menu layers 91 and 92 of steering switch menu 90, respectively. When the operator operates steering switch 22 while a certain menu layer of touch panel menu 80 is displayed on display screen 25A, display screen 25A displays menu layer 92 of switch menu 90 corresponding to certain menu layer 82 being displayed. Thus, the operator does not need to operate steering switch 22 while going back and forth between different menu layers, thus providing a quick operation of in-vehicle display system 30 with steering switch 22.

When the operator touches and operates touch panel 26 while steering switch menu 90 is displayed on display screen 25A, an icon that is displayed at the position on display screen 25A corresponding to the touched position of touch panel 26 is selected. As a result, the steering switch menu can reflect the touch operation to touch panel 26, thus providing a quick operation.

As described above, according to the embodiment, when the operator operates touch panel 26, in-vehicle display 25 is operable to display touch panel menu 80 including icons 61A to 61F on display screen 25A. When the operator operates steering switch 22 while touch panel menu 80 is displayed on display screen 25A, in-vehicle display 25 is operable to cause to newly display, in touch panel menu 80, steering switch menu 90 including icons 61A to 61F in a different layout from that of the previous display screen 25A, steering switch menu 90 including icons 61A to 61F in a different layout from that of the previous display screen 25A.

According to the embodiment, touch panel menu 80 includes icons 61A to 61F arranged in a matrix form. Steering switch menu 90 includes icons 61A to 61F arranged along ellipse circumference 91A.

According to the embodiment, when operator touches the touch panel at the position of certain icon 61B out of icons 61A to 61F while steering switch menu 90 is displayed on display screen 25A, in-vehicle display 25 selects certain icon 61B.

According to the embodiment, touch panel menu 80 includes menu layers 81 and 82. Steering switch menu 90 has menu layers 91 and 92 corresponding to menu layers 81 and 82, respectively. When the operator operates steering switch 22 while certain menu layer 81 out of menu layers 81 and 82 of touch panel menu 80 is displayed on display screen 25A, in-vehicle display 25 is operable to replace certain menu layer 81 with certain menu layer 91 out of menu layers 91 and 92 of steering switch menu 90 corresponding to certain menu layer 81 to display certain menu layer 91 on display screen 25A.

According to the embodiment, menu layers 81 and 82 of touch panel menu 80 are not displayed on display screen 25A simultaneously to each other. Menu layers 91 and 92 of steering switch menu 90 are not displayed on display screen 25A simultaneously to each other.

According to the embodiment, icons 61A to 61F are displayed both in certain menu layer 81 of touch panel menu 80 and certain menu layer 91 of steering switch menu 90.

According to the embodiment, icons 61A to 61F are displayed in menu layer 91 of steering switch menu 90. When the operator touches the position on touch panel 26 of icon 61B among icons 61A to 61F while certain menu layer 91 of steering switch menu 90 is displayed on display screen 25A, in-vehicle display 25 is operable to replace certain menu layer 91 with one menu layer 82 out of menu layers 81 and 82 of touch panel menu 80 to display one menu layer 82 on display screen 25A.

Generally, the present application concerns a controller 24 for an in-vehicle display system including a touch panel display device 26, 25 and a steering switch 22 coupled to the controller 24, and a plurality of in-vehicle control devices 31, 32, 33, 34 operatively controlled by the controller 24. The controller 24 is configured to:

(1) generate a top level touch panel menu 81 to be displayed on the touch panel display device, the top level touch panel menu 81 including a plurality of icons 61A, 61B, 61C, 61D, 61E, 61F associated with the plurality of in-vehicle control devices;

(2) generate a second level touch panel menu 82 to be displayed on the touch panel display device in response to a selection of one of the plurality of icons via the touch panel display device;

(3) generate a top level steering switch menu 91 to be displayed on the touch panel display device coupled to the controller, the top level steering switch menu display including a plurality of icons 61A, 61B, 61C, 61D, 61E, 61 associated with the plurality of in-vehicle control devices, the plurality of icons arranged differently from those of the top level touch panel menu;

(4) generate a second level steering switch menu 92 to be displayed on the touch panel display device in response to a selection of one of the plurality of icons via the steering switch;

(5) switch from one of the top level touch panel menu 81 and the second level touch panel menu 82 to one of the top level steering switch menu 91 and the second level steering switch menu 92 when the steering switch 22 is operated to make a selection during display of the top level touch panel menu 81 or the second level touch panel menu 82; and (6) switch from one of the top level steering switch menu 91 and the second level steering switch menu 92 to one of the top level touch panel menu 81 and the second level touch panel menu 82 when the touch panel display device is operated to make a selection during the second level steering switch menu display 92.

For example, when the second level steering switch menu 92 is displayed on the touch panel display, if the home icon 74 is touched by the user, the controller can switch the display to the top level touch panel menu 81. Further, when the second level touch panel menu 82 is displayed on the touch panel display, if the initial menu 53 of the steering switch is operated by the user, the controller can switch the display to the top level steering switch menu 91. The present disclosure is not limited to the embodiments of the above description.

What is claimed is:

1. A controller for an in-vehicle display system including a touch panel display device and a steering switch coupled to the controller, and a plurality of in-vehicle control devices operatively controlled by the controller, the controller being configured to:
    generate a top level touch panel menu to be displayed on the touch panel display device, the top level touch panel menu including a plurality of icons associated with the plurality of in-vehicle control devices;
    generate a second level touch panel menu to be displayed on the touch panel display device in response to a selection of one of the plurality of icons via the touch panel display device;
    generate a top level steering switch menu to be displayed on the touch panel display device, the top level steering switch menu display including a plurality of icons associated with the plurality of in-vehicle control devices, the plurality of icons arranged differently from those of the top level touch panel menu;
    generate a second level steering switch menu to be displayed on the touch panel display device in response to a selection of one of the plurality of icons via the steering switch;
    switch from the top level touch panel menu to the top level steering switch menu when the steering switch is operated to make a selection during display of the top level touch panel menu;
    switch from the second level touch panel menu to the second level steering switch menu when the steering switch is operated to make a selection during display of the second level touch panel menu;
    switch from the top level steering switch menu to the top level touch panel menu when the touch panel display device is operated to make a selection during the display of the top level steering switch menu; and
    switch from the second level steering switch menu to the second level touch panel menu when the touch panel display device is operated to make a selection during the display of the second level steering switch menu.

2. The in-vehicle display system according to claim 1, wherein the plurality of icons are arranged in a matrix form in the touch panel menu, and
    wherein the plurality of icons are arranged along an ellipse circumference in the steering switch menu.

3. The in-vehicle display system according to claim 1, wherein, when an operator touches the touch panel display device at a position of a certain icon out of the plurality of icons while the top level or second level steering switch menu is displayed, the certain icon is selected.

4. The in-vehicle display system according to claim 1,
    wherein the top level touch panel menu and the second level touch panel menu are not displayed on the display screen touch panel display device simultaneously to each other; and
    wherein the top level steering switch menu and the second level steering switch menu are not displayed on the touch panel display device simultaneously to each other.

5. A controller for an in-vehicle display system including a touch panel display device and a steering switch coupled to the controller, and a plurality of in-vehicle control devices operatively controlled by the controller, the controller being configured to:
    generate a top level touch panel menu to be displayed on the touch panel display device, the top level touch panel menu including a plurality of icons associated with the plurality of in-vehicle control devices;
    generate a second level touch panel menu to be displayed on the touch panel display device in response to a selection of one of the plurality of icons via the touch panel display device;
    generate a top level steering switch menu to be displayed on the touch panel display device, the top level steering switch menu display including a plurality of icons associated with the plurality of in-vehicle control devices, the plurality of icons arranged differently from those of the top level touch panel menu;
    generate a second level steering switch menu to be displayed on the touch panel display device in response to a selection of one of the plurality of icons via the steering switch;
    switch from the top level touch panel menu to the top level steering switch menu or the second level steering switch menu when the steering switch is operated to make a selection during display of the top level touch panel menu;
    switch from the second level touch panel menu to the second level steering switch menu when the steering switch is operated to make a selection during display of the second level touch panel menu;
    switch from the top level steering switch menu to the top level touch panel menu or the second level touch panel menu when the touch panel display device is operated to make a selection during the display of the top level steering switch menu; and
    switch from the second level steering switch menu to the second level touch panel menu when the touch panel display device is operated to make a selection during the display of the second level steering switch menu.

* * * * *